No. 719,808. PATENTED FEB. 3, 1903.
T. C. JOHNSON.
TWO TUBE GRAVITY CHARGER FOR MAGAZINE GUNS.
APPLICATION FILED SEPT. 15, 1902.
NO MODEL. 2 SHEETS—SHEET 1.
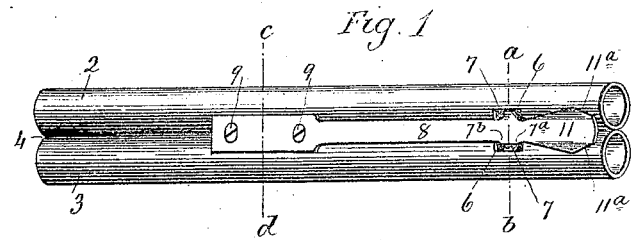
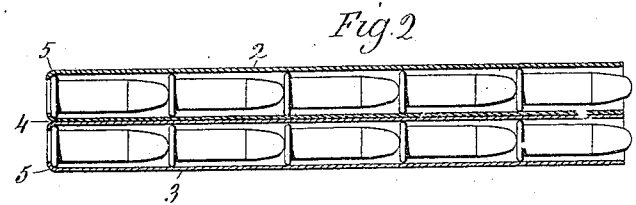
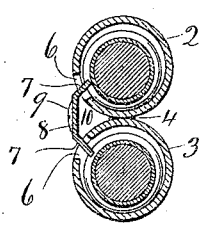 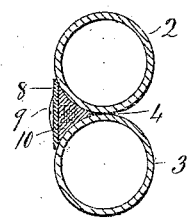
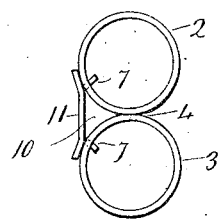
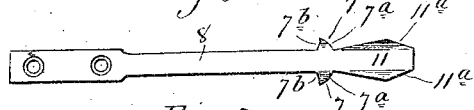
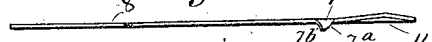
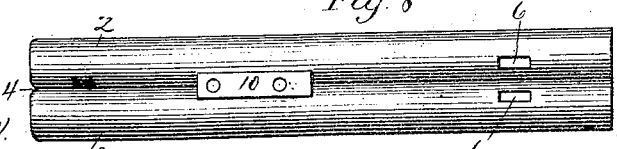

No. 719,808. PATENTED FEB. 3, 1903.
T. C. JOHNSON.
TWO TUBE GRAVITY CHARGER FOR MAGAZINE GUNS.
APPLICATION FILED SEPT. 15, 1902.
NO MODEL. 2 SHEETS—SHEET 2.
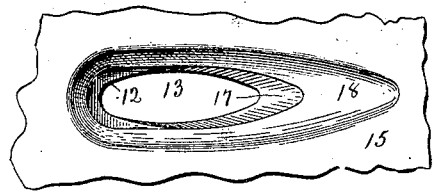
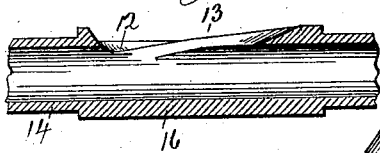
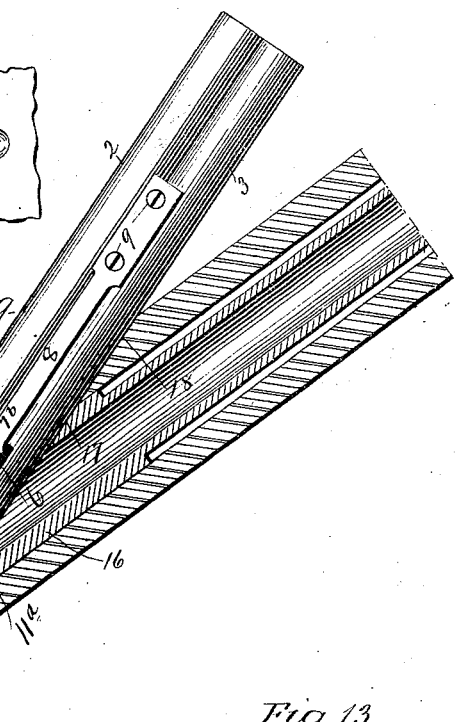
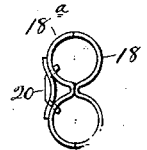
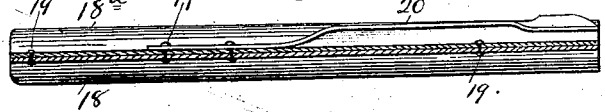
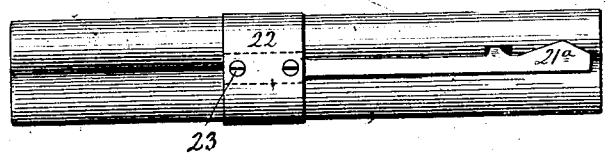
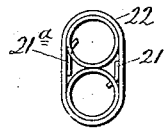

UNITED STATES PATENT OFFICE.

THOMAS C. JOHNSON, OF NEW HAVEN, CONNECTICUT, ASSIGNOR TO WINCHESTER REPEATING ARMS CO., OF NEW HAVEN, CONNECTICUT, A CORPORATION.

TWO-TUBE GRAVITY-CHARGER FOR MAGAZINE-GUNS.

SPECIFICATION forming part of Letters Patent No. 719,808, dated February 3, 1903.

Application filed September 15, 1902. Serial No. 123,466. (No model.)

*To all whom it may concern:*

Be it known that I, THOMAS C. JOHNSON, of New Haven, in the county of New Haven and State of Connecticut, have invented a new and useful Improvement in Two-Tube Gravity-Chargers for Tubular Magazine-Guns; and I do hereby declare the following, when taken in connection with the accompanying drawings and the figures of reference marked thereon, to be a full, clear, and exact description of the same, and which said drawings constitute part of this specification, and represent, in—

Figure 1, a view in perspective of one form which a two-tube charger constructed in accordance with my invention may assume; Fig. 2, a view thereof in central longitudinal section; Fig. 3, an enlarged view of the charger in transverse section on the line $a\ b$ of Fig. 1; Fig. 4, a corresponding view on the line $c\ d$ of Fig. 1; Fig. 5, an enlarged view of the device looking into its charging end; Fig. 6, a detached view of the cartridge-retaining spring on the scale of Figs. 1 and 2; Fig. 7, an edge view of the said spring; Fig. 8, a plan view of the tubes with the spring removed; Fig. 9, a broken view, partly in elevation and partly in section, showing the mode of applying the charger to the stock of a gun having a tubular magazine in its butt-stock; Fig. 10, a broken plan view showing the character of the charging-opening in the magazine-tube and of the clearance-opening therefor in the butt-stock; Fig. 10$^a$, a broken view of the magazine-tube in longitudinal section to show the charging-opening and the surfaces at the ends thereof; Fig. 11, a plan view of one of the modified forms which my improved charger may assume; Fig. 12, a longitudinal sectional view thereof; Fig. 13, an end view of the charging end thereof; Fig. 14, a plan view of still another modification which my improved charger may assume; Fig. 15, an end view of the charging end thereof.

My invention relates to an improvement in tubular chargers for charging the magazines of tubular magazine-guns, the object being to produce a simple, compact, reliable, and convenient device for the purpose stated.

With these ends in view my invention consists in a two-tube charger for charging the magazines of tubular magazine-guns, the tubes being placed side by side.

My invention further consists in certain details of construction and combinations of parts, as will be hereinafter described, and pointed out in the claims.

In carrying out my invention, as shown in Figs. 1 to 10, inclusive, I employ two independently-formed sheet-metal tubes 2 and 3, corresponding in diameter and length and secured together by a line of brazing 4 or in any other well-known manner. These tubes are adapted in length to receive, say, five cartridges and in diameter to permit the cartridges to slide freely in and out of them. The outer end of each tube is spun inwardly to form a retaining-flange 5 for the retention of the cartridges, which might, however, be retained in the tubes in some other way. Each tube is formed near its forward or charging end with a small rectangular opening or slot 6, respectively receiving cartridge-retaining teeth 7, entering the tubes through the said slots and formed integral with and upon the opposite edges of a long flat cartridge-retaining spring 8, secured at its rear end by screws 9 to a block-like spring-retaining seat 10, substantially triangular in cross-section and fastened by brazing or otherwise between the two tubes to the rear of their longitudinal centers. These teeth 7 are located directly opposite each other and at a right angle to the longitudinal axis of the spring. At its forward end the said spring 8 is enlarged to form an angular operating-head 11, slightly dished in cross-section to conform to the curvature of the tubes between which it virtually lies. This single spring 8 suffices for the retention of the cartridges in both tubes and in being operated is sprung edgewise or laterally, whereby it is caused to ride upon the tubes so as also to be moved slightly outwardly with respect thereto. The forward edges of the teeth 7 are rounded, as at 7$^a$, so that when a cartridge is inserted headforemost into one of the tubes its head will engage with the said rounded surface of the tooth. Then when the cartridge is pressed inward by slight endwise pressure upon its bullet end its head will coact with the said rounded surface of the tooth and cause the spring to be sufficiently displaced to permit the cartridge to pass by the tooth into the tube, after which the slightly-concaved inner edge 7ʰ of the tooth will prevent the cartridge from escaping from the tube when the charger is being carried and handled. For the purpose of moving the spring so as to permit the cartridges to run out of the tubes by gravity in charging a gun the head 11 of the spring 8 is formed with two tapered or inclined surfaces 11ᵃ, located directly opposite each other, one or the other of these surfaces being brought into play, according to the tube being emptied. These inclined surfaces, which may be considered as bevels or as cams, ride upon a slightly-concaved two-pronged bearing-surface 12, located at the forward end of a long oval charging-opening 13, laterally entering the outer magazine-tube 14, which in the gun chosen for illustration is permanently located in the butt-stock 15 of the gun, which will be sufficiently described for the purposes of disclosing my present invention by reference to Patent No. 681,481, granted August 27, 1901, to the Winchester Repeating Arms Company upon my application. The said opening 13 enters the tube 14 at an angle of about twenty degrees to the longitudinal axis thereof. At the point where the tube 14 is formed with a charging-opening 13 the tube is formed with a long shoulder 16, formed integral therewith; but this shoulder might be produced by brazing a sleeve onto the tube. The said opening 13 enters the tube 14 at an angle, as described, and results in the production of an inclined bearing-surface 17, which pitches toward the center of the tube 14 and forms a seat or bearing to receive and guide the charging end of either one of the two tubes 2 and 3 as the charger is applied to the gun. The forward end of the bearing-surface 17 extends under the rear portion of the surface 12, before referred to, as shown by Fig. 10ᵃ. A similar clearance-opening 18 is formed in the stock 15 to give access to the opening 13, as seen in Fig. 10. In order to charge the tube 14, one of the two tubes of the charger is applied to the surface 17 and shoved forward and inward as far as it will go. As it approaches the limit of its forward movement one of the two operating-surfaces 11ᵃ of the head 11 of the spring 8, depending upon which of the two tubes 2 and 3 is being emptied, will ride upon the surface 12 and cause the spring to be moved edgewise sufficiently to displace the retaining-tooth 7 in the tube to be emptied enough to clear the cartridges in the tube and allow them to gravitate by it into the magazine-tube 14. The operation of charging the tube 14 is therefore effected very easily and expeditiously. When one tube has been emptied, the charger is simply revolved in the hand of the user by a simple movement of his fingers and the other tube emptied in the same manner, at which time the other operating-surface 11ᵃ will be brought into play. If there are already some cartridges in the tube 14, only so many will be emptied from the charger as are necessary to fill it, because the teeth 7 of the spring 8 are so located with reference to the forward ends of the tubes that any cartridge which is not free to enter the magazine-tube 14 will be retained in the charger.

It is obvious that the charger may be made in a variety of ways. Thus instead of using two independently-formed tubes brazed together they may be struck up in half-sections and riveted together, as shown in Figs. 11, 12, and 13, in which the half-sections 18 and 18ᵃ are secured together by rivets 19. In this case the spring-seat 10, before referred to, will be dispensed with and the rivets 19 utilized for securing the spring 20 in place. In this construction by preference the tubes will be slightly separated from each other at their rear ends for the better accommodation of the spring 20.

In the modified construction shown by Figs. 14 and 15 I employ two cartridge-retaining springs 21 21ᵃ instead of one spring, these two springs at their forward ends virtually constituting the half-section of the forward end of the spring 8. They may be secured in place in any desired manner; but I have shown for the purpose a strap 22, to which they are fastened by rivets or screws 23 or in any other way.

It is obvious that in carrying out my invention still other forms and constructions may be resorted to and also that my improved charger may be used for charging guns having their tubular magazines differently constructed and arranged. I would therefore have it understood that I do not limit myself to what is herein shown and described, but hold myself at liberty to make such departures therefrom as fairly fall within the spirit and scope of my invention.

Having fully described my invention, what I claim as new, and desire to secure by Letters Patent, is—

1. A two-tube charger for charging the magazines of tubular magazine-guns, the said charger comprising two corresponding tubes located side by side and connected together, each formed for the reception of cartridges, and means secured to the outside of the charger and entering the same near the charging ends for retaining the cartridges therein, substantially as described.

2. A two-tube charger for charging the magazines of tubular magazine-guns, the said charger comprising two tubes located side by side and connected together, each formed to receive a column of cartridges, and a single spring entering both tubes for retaining the cartridges therein and adapted to be displaced for permitting either tube to be emptied.

3. A two-tube charger for charging the magazines of tubular magazine-guns comprising two tubes located side by side and each adapted to receive a column of cartridges, and a spring formed with two cartridge-retaining teeth entering the respective tubes near the charging ends thereof, and with a head having two operating-surfaces by means of which the spring is sprung one way or the other for displacing the teeth with respect to the cartridges in the tubes.

4. In a two-tube charger for charging the magazines of tubular magazine-guns, the combination with two tubes each adapted to receive a column of cartridges, located side by side and each formed near its charging end with a slot, of a single spring attached to the said tubes, provided with two cartridge-retaining teeth entering the respective tubes through the slots therein, and with an operating-head having two oppositely-inclined operating-surfaces for springing the spring for displacing the teeth with respect to the tubes.

5. In a two-tube charger for charging the magazines of tubular magazine-guns, the combination with two tubes located side by side, corresponding to each other in length and diameter, each having its outer end spun inwardly to form a cartridge-retaining flange, and each having its charging end formed with a slot; of a spring connected at its outer end with the said tubes, formed near its charging end with teeth entering the slots, the said spring being also provided with an operating-head having oppositely-inclined operating-surfaces, whereby the spring is sprung edgewise in one direction or the other for clearing the teeth from the cartridges in the tubes.

In testimony whereof I have signed this specification in the presence of two subscribing witnesses.

THOMAS C. JOHNSON.

Witnesses:
 FREDERIC C. EARLE,
 CLARA L. WEED.